United States Patent
Chinthekindi et al.

(10) Patent No.: US 10,949,088 B1
(45) Date of Patent: Mar. 16, 2021

(54) METHOD OR AN APPARATUS FOR HAVING PERFECT DEDUPLICATION, ADAPTED FOR SAVING SPACE IN A DEDUPLICATION FILE SYSTEM

(71) Applicant: EMC IP Holding Company LLC, Hopkinton, MA (US)

(72) Inventors: Ramprasad Chinthekindi, Pune (IN); Nitin Madan, Gurugram (IN); Abhinav Duggal, Santa Clara, CA (US); Lan Bai, Chelsea, MI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 11 days.

(21) Appl. No.: 15/656,661

(22) Filed: Jul. 21, 2017

(51) Int. Cl.
| | |
|---|---|
| *G06F 16/27* | (2019.01) |
| *G06F 3/06* | (2006.01) |
| *G06F 16/185* | (2019.01) |
| *G06F 16/174* | (2019.01) |
| *G06F 16/22* | (2019.01) |

(52) U.S. Cl.
CPC ............ *G06F 3/0608* (2013.01); *G06F 3/065* (2013.01); *G06F 3/0619* (2013.01); *G06F 3/0647* (2013.01); *G06F 3/0652* (2013.01); *G06F 16/1748* (2019.01); *G06F 16/185* (2019.01); *G06F 16/2255* (2019.01); *G06F 16/27* (2019.01)

(58) Field of Classification Search
CPC ..................................................... G06F 16/00
See application file for complete search history.

(56) References Cited

U.S. PATENT DOCUMENTS

| | | |
|---|---|---|
| 7,085,911 B2 | 8/2006 | Sachedina et al. |
| 7,818,515 B1 | 10/2010 | Umbehocker et al. |
| 8,046,551 B1 | 10/2011 | Sahin |
| 8,190,835 B1 | 5/2012 | Yueh |
| 8,204,868 B1 | 6/2012 | Wu et al. |
| 8,396,841 B1 | 3/2013 | Janakiraman |
| 8,732,403 B1 | 5/2014 | Nayak |
| 8,782,323 B2 | 7/2014 | Glikson et al. |
| 8,898,114 B1 | 11/2014 | Feathergill et al. |
| 8,898,120 B1 | 11/2014 | Efstathopoulos |

(Continued)

FOREIGN PATENT DOCUMENTS

| | | |
|---|---|---|
| EP | 2738665 A1 | 6/2014 |
| WO | 2013056220 A1 | 4/2013 |

(Continued)

OTHER PUBLICATIONS

Extended European Search Report issued in corresponding European Application No. 18185076.9, dated Dec. 7, 2018 (9 pages).

(Continued)

*Primary Examiner* — Khanh B Pham
(74) *Attorney, Agent, or Firm* — Chamberlain, Hrdlicka, White, Williams & Aughtry (57) ABSTRACT

A data management device includes a persistent storage and a processor. The persistent storage includes an object storage. The processor generates a collision free hash function based on segments stored in the object storage. The processor generates a hash vector using the collision free hash function. The processor deduplicates the segments using the hash vector. The processor stores the deduplicated segments in the object storage.

11 Claims, 10 Drawing Sheets

(56) References Cited

U.S. PATENT DOCUMENTS

| | | | |
|---|---|---|---|
| 8,904,120 | B1 | 12/2014 | Killammsetti et al. |
| 8,918,390 | B1 | 12/2014 | Shilane et al. |
| 8,943,032 | B1 | 1/2015 | Xu et al. |
| 8,949,208 | B1 | 2/2015 | Xu et al. |
| 9,183,200 | B1 | 11/2015 | Liu et al. |
| 9,244,623 | B1 * | 1/2016 | Bent ............... G06F 3/0641 |
| 9,250,823 | B1 | 2/2016 | Kamat et al. |
| 9,251,160 | B1 | 2/2016 | Wartnick |
| 9,274,954 | B1 | 3/2016 | Bairavasundaram et al. |
| 9,280,550 | B1 | 3/2016 | Hsu et al. |
| 9,298,724 | B1 | 3/2016 | Patil et al. |
| 9,317,218 | B1 * | 4/2016 | Botelho ............... G06F 3/0655 |
| 9,336,143 | B1 * | 5/2016 | Wallace ............... G06F 12/121 |
| 9,390,116 | B1 | 7/2016 | Li et al. |
| 9,390,281 | B2 | 7/2016 | Whaley et al. |
| 9,424,185 | B1 | 8/2016 | Botelho et al. |
| 9,442,671 | B1 | 9/2016 | Zhang et al. |
| 9,830,111 | B1 | 11/2017 | Patiejunas et al. |
| 10,002,048 | B2 | 6/2018 | Chennamsetty et al. |
| 10,031,672 | B2 | 7/2018 | Wang et al. |
| 10,078,451 | B1 | 9/2018 | Floyd et al. |
| 10,102,150 | B1 | 10/2018 | Visvanathan et al. |
| 10,175,894 | B1 | 1/2019 | Visvanathan et al. |
| 10,445,292 | B1 | 10/2019 | Zhang et al. |
| 2003/0110263 | A1 | 6/2003 | Shillo |
| 2005/0120058 | A1 | 6/2005 | Nishio |
| 2005/0160225 | A1 | 7/2005 | Presler-Marshall |
| 2005/0182906 | A1 | 8/2005 | Chatterjee et al. |
| 2006/0075191 | A1 | 4/2006 | Lolayekar et al. |
| 2008/0082727 | A1 | 4/2008 | Wang |
| 2008/0133446 | A1 | 6/2008 | Dubnicki et al. |
| 2008/0133561 | A1 | 6/2008 | Dubnicki et al. |
| 2008/0216086 | A1 | 9/2008 | Tanaka et al. |
| 2008/0244204 | A1 | 10/2008 | Cremelie et al. |
| 2009/0235115 | A1 | 9/2009 | Butlin |
| 2009/0271454 | A1 | 10/2009 | Anglin et al. |
| 2010/0049735 | A1 * | 2/2010 | Hsu ............... G06F 16/1727 707/E17.005 |
| 2010/0094817 | A1 | 4/2010 | Ben-Shaul et al. |
| 2010/0250858 | A1 | 9/2010 | Cremelie et al. |
| 2011/0055471 | A1 | 3/2011 | Thatcher et al. |
| 2011/0099200 | A1 | 4/2011 | Blount et al. |
| 2011/0099351 | A1 | 4/2011 | Condict |
| 2011/0161557 | A1 | 6/2011 | Haines et al. |
| 2011/0185149 | A1 | 7/2011 | Gruhl et al. |
| 2011/0196869 | A1 | 8/2011 | Patterson et al. |
| 2011/0231594 | A1 | 9/2011 | Sugimoto et al. |
| 2011/0276781 | A1 | 11/2011 | Sengupta et al. |
| 2012/0158670 | A1 | 6/2012 | Sharma et al. |
| 2012/0209873 | A1 | 8/2012 | He |
| 2012/0278511 | A1 | 11/2012 | Alatorre et al. |
| 2013/0055018 | A1 | 2/2013 | Joshi et al. |
| 2013/0060739 | A1 | 3/2013 | Kalach et al. |
| 2013/0111262 | A1 | 5/2013 | Taylor et al. |
| 2013/0138620 | A1 | 5/2013 | Yakushev et al. |
| 2014/0012822 | A1 | 1/2014 | Aronovich et al. |
| 2014/0040205 | A1 | 2/2014 | Cometto et al. |
| 2014/0047181 | A1 | 2/2014 | Peterson et al. |
| 2014/0258248 | A1 | 9/2014 | Lambright et al. |
| 2014/0258824 | A1 | 9/2014 | Khosla et al. |
| 2014/0281215 | A1 | 9/2014 | Chen et al. |
| 2014/0310476 | A1 | 10/2014 | Kruus |
| 2015/0074679 | A1 | 3/2015 | Fenoglio et al. |
| 2015/0106345 | A1 | 4/2015 | Trimble et al. |
| 2015/0178171 | A1 | 6/2015 | Bish et al. |
| 2015/0331622 | A1 | 11/2015 | Chiu et al. |
| 2016/0026652 | A1 | 1/2016 | Zheng |
| 2016/0112475 | A1 | 4/2016 | Lawson et al. |
| 2016/0188589 | A1 | 6/2016 | Guilford et al. |
| 2016/0224274 | A1 | 8/2016 | Kato |
| 2016/0239222 | A1 | 8/2016 | Shetty et al. |
| 2016/0323367 | A1 | 11/2016 | Murtha et al. |
| 2016/0342338 | A1 | 11/2016 | Wang |
| 2017/0093961 | A1 | 3/2017 | Pacella et al. |
| 2017/0199894 | A1 | 7/2017 | Aronovich et al. |
| 2017/0220281 | A1 | 8/2017 | Gupta et al. |
| 2017/0220334 | A1 | 8/2017 | Hart et al. |
| 2017/0300424 | A1 | 10/2017 | Beaverson et al. |
| 2017/0352038 | A1 * | 12/2017 | Parekh ............... G06Q 30/018 |
| 2017/0359411 | A1 | 12/2017 | Burns et al. |
| 2018/0089037 | A1 | 3/2018 | Liu et al. |
| 2018/0146068 | A1 | 5/2018 | Johnston et al. |
| 2018/0322062 | A1 | 11/2018 | Watkins et al. |

FOREIGN PATENT DOCUMENTS

| | | |
|---|---|---|
| WO | 2013115822 A1 | 8/2013 |
| WO | 2014185918 A1 | 11/2014 |

OTHER PUBLICATIONS

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

International Search Report and Written Opinion issued in corresponding PCT Application PCT/US2018/027646, dated Jul. 27, 2018. (30 pages).

Extended European Search Report issued in corresponding European Application No. 18184842.5, dated Sep. 19, 2018.

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

Deepavali Bhagwat et al.; "Extreme Binning: Scalable, Parallel Deduplication for Chunk-based File Backup"; IEEE MASCOTS; Sep. 2009 (10 pages).

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

International Search Report and Written Opinion issued in corresponding WO application No. PCT/US2018/027642, dated Jun. 7, 2018 (15 pages).

Aseem Kishore; "What is a Checksum and How to Calculate a Checksum"; Online Tech Tips; Feb. 18, 2015; https://www.online-tech-tips.com/cool-websites/what-is-checksum/.

* cited by examiner

METHOD OR AN APPARATUS FOR HAVING PERFECT DEDUPLICATION, ADAPTED FOR SAVING SPACE IN A DEDUPLICATION FILE SYSTEM

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a data management device in accordance with one or more embodiments of the invention includes a persistent storage and a processor. The persistent storage includes an object storage. The processor generates a collision free hash function based on segments stored in the object storage, generates a hash vector using the collision free hash function, deduplicates the segments using the hash vector, and stores the deduplicated segments in the object storage.

In one aspect, a method of operating a data management device in accordance with one or more embodiments of the invention includes generating, by the data management device, a collision free hash function based on segments stored in an object storage; generating, by the data management device, a hash vector using the collision free hash function; and deduplicating, by the data management device, the segments using the hash vector.

In one aspect, a non-transitory computer readable medium in accordance with one or more embodiments of the invention includes computer readable program code, which when executed by a computer processor enables the computer processor to perform a method for operating a data management device, the method includes generating, by the data management device, a collision free hash function based on segments stored in an object storage; generating, by the data management device, a hash vector using the collision free hash function; and deduplicating, by the data management device, the segments using the hash vector.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for storing data. More specifically, the systems, devices, and methods may reduce the amount of storage required to store data.

In one or more embodiments of the invention, a data management device may deduplicate data stored in a persistent storage. The persistent storage may be organized as an object storage. The data management device may deduplicate the data by identifying duplicate data segments, deleting the duplicate data segments, and updating recipes of files based on the deleted data segments. Removing the duplicate data segments may reduce the quantity of storage required to store the deduplicated data when compared to the quantity of storage space required to store the data without being deduplicated.

For example, when multiple versions of a large text document having only minimal differences between each of the versions are stored, storing each version will require approximately the same amount of storage space of a persistent storage. In contrast, when the multiple versions of the large text document are deduplicated, only the first version of the multiple versions stored will require a substantial amount of storage. Only segments that are unique to both versions of the word document will be retained in the storage. Duplicate segments will be removed.

In one or more embodiments of the invention, the deduplication may be performed as part of a garbage collections process. For example, periodically a portion of a data storage may be selected for deduplication. Deduplicating the portion periodically may remove duplicated segments and thereby reduce the quantity of physical storage required to store the data.

FIG. 1 shows a system in accordance with one or more embodiments of the invention. The system may include clients (100) that store data in the data management device (110).

Figure 1A:
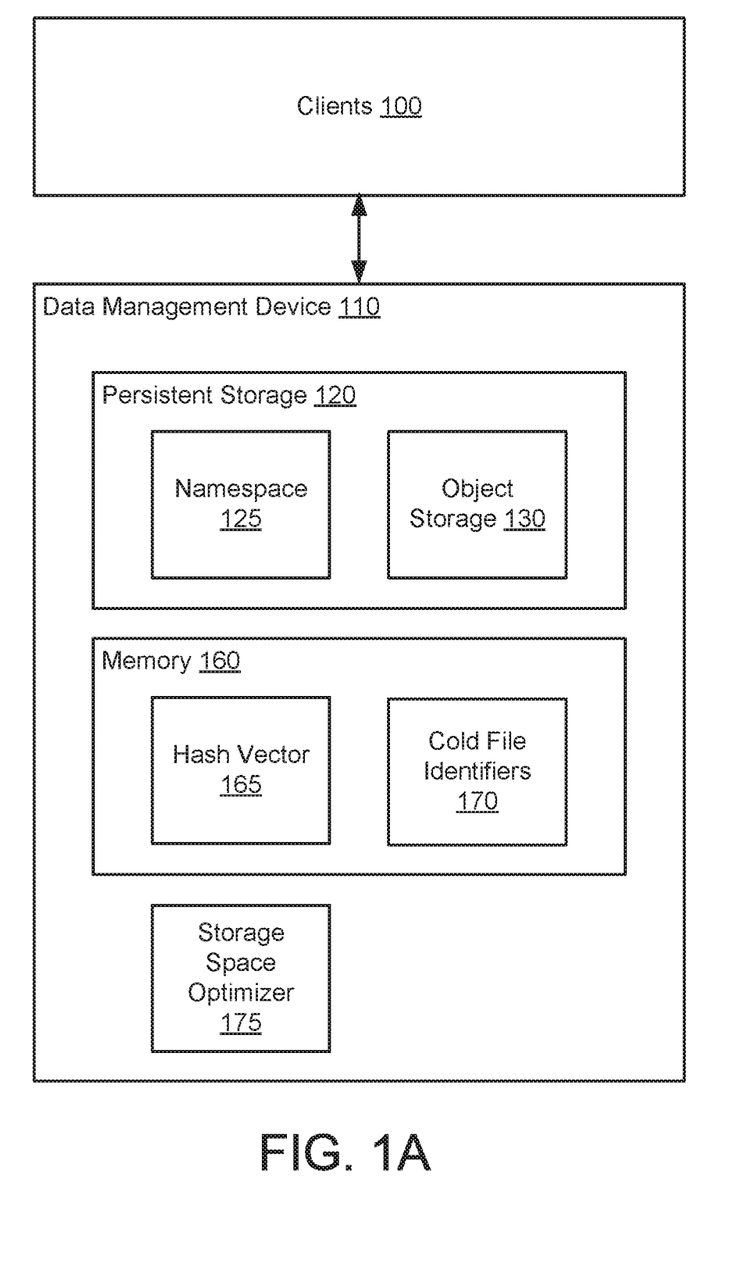
FIG. 1A shows a diagram of a system in accordance with one or more embodiments of the invention.

The clients (100) may be computing devices. The computing devices may be, for example, mobile phones, tablet computers, laptop computers, desktop computers, or servers. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention. The clients (100) may be operably linked to the data management device (110) via a network.

The data management device (110) may be a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and illustrated in at least FIGS. 3A-3F. The data management device (110) may be other types of computing devices without departing from the invention.

The data management device (110) may include a persistent storage (120), a memory (160), and a storage space optimizer (175). Each component of the data management device (110) is discussed below.

The data management device (110) may include a persistent storage (120). The persistent storage (120) may include physical storage devices. The physical storage devices may be, for example, hard disk drives, solid state drives, tape drives, or any other type of persistent storage media. The persistent storage (120) may include any number and/or combination of physical storage devices.

The persistent storage (120) may include an object storage (130) for storing data from the clients (100). As used herein, an object storage is a data storage architecture that manages data as objects. Each object may include a number of bytes for storing data in the object. In one or more embodiments of the invention, the object storage does not include a file system. Rather, a namespace (125) may be used to organize the data stored in the object storage. For additional details regarding the object storage (130), see FIGS. 1B-1D.

The object storage (130) may be a partially deduplicated storage. As used herein, a partially deduplicated storage refers to a storage that attempts to reduce the required amount of storage space to store data by not storing multiple copies of the same files or bit patterns located near the storage location of the data within the object storage when a the data is first stored in the object storage. A partially deduplicates storage attempts to balance the input-output (IO) limits of the physical devices on which the object storage is stored by only comparing the to-be-stored data to a portion of all of the data stored in the object storage.

To partially deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated a portion of the data already stored in the object storage. Any segments of the to-be-stored data that do not match a fingerprint of the portion of the data already stored in the object storage may be stored in the object storage, the other segments are not stored in the object storage. A recipe to generate the now-stored data may be generated and stored so that the now-stored data may be retrieved from the object storage. The recipe may specify all of the segments of the to-be-stored data that were stored in the object storage and may also specify all of the segments of the data already stored in the object storage having fingerprints that matched the fingerprints of the segments of the to-be-stored data.

As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is $10^{-20}$ or less. In one or more embodiments of the invention, the unavoidable fatal error may be caused by a force of nature such as, for example, a tornado. In other words, the fingerprint of any two segments that specify different data will virtually always be different.

The persistent storage (120) may include the namespace (125). The namespace (125) may be a data structure stored on physical storage devices of the persistent storage (120) that organizes the data storage resources of the physical storage devices.

In one or more embodiments of the invention, the namespace (125) may associate a file with a file recipe stored in the object storage. The file recipe may be used to generate the file based using segments stored in the object storage. For additional details regarding file recipes, See FIG. 1C.

The data management device (110) may include a memory (160). The memory (160) may store a hash vector (165). The hash vector (165) may be a data structure including a number of bits corresponding to the number of unique segments stored in the object storage (130). Each bit of the hash vector (165) may correspond to a fingerprint of a segment stored in the object storage (130). Fingerprints of multiple segments may be mapped to the same bit of the hash vector. Each of the fingerprints of the multiple segments that map to the same bit of the hash vector may be identical, i.e., each of the segments corresponding to the fingerprints that each map to the same bit of the hash vector may be identical.

In one or more embodiments of the invention, the hash vector may be generated by a collision free hash function applied to each of the fingerprints stored in the object storage. The collision free hash function may be a perfect hash function.

The memory (160) may store cold file identifiers (170). The cold file identifiers (170) may be a data structure that specifies one or more files stored on the object storage that are accessed infrequently. The cold file identifiers (170) may be generated using the method shown in FIG. 3B.

The data management may include a storage space optimizer (175). The storage space optimizer (175) may deduplicate the object storage (130). Deduplicating the object storage (130) may reduce the amount of storage space to store the object storage (130).

In one or more embodiments of the invention, the storage space optimizer (175) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described above and to perform the methods shown in FIGS. 3A-3F.

In one or more embodiments of the invention, the storage space optimizer (175) may be implemented as computer instructions, e.g., computer code, stored on a persistent storage that when executed by a processor of the data management device (110) cause the data management device (110) to provide the functionality described above and perform the methods shown in FIGS. 3A-3F.

Figure 1B:
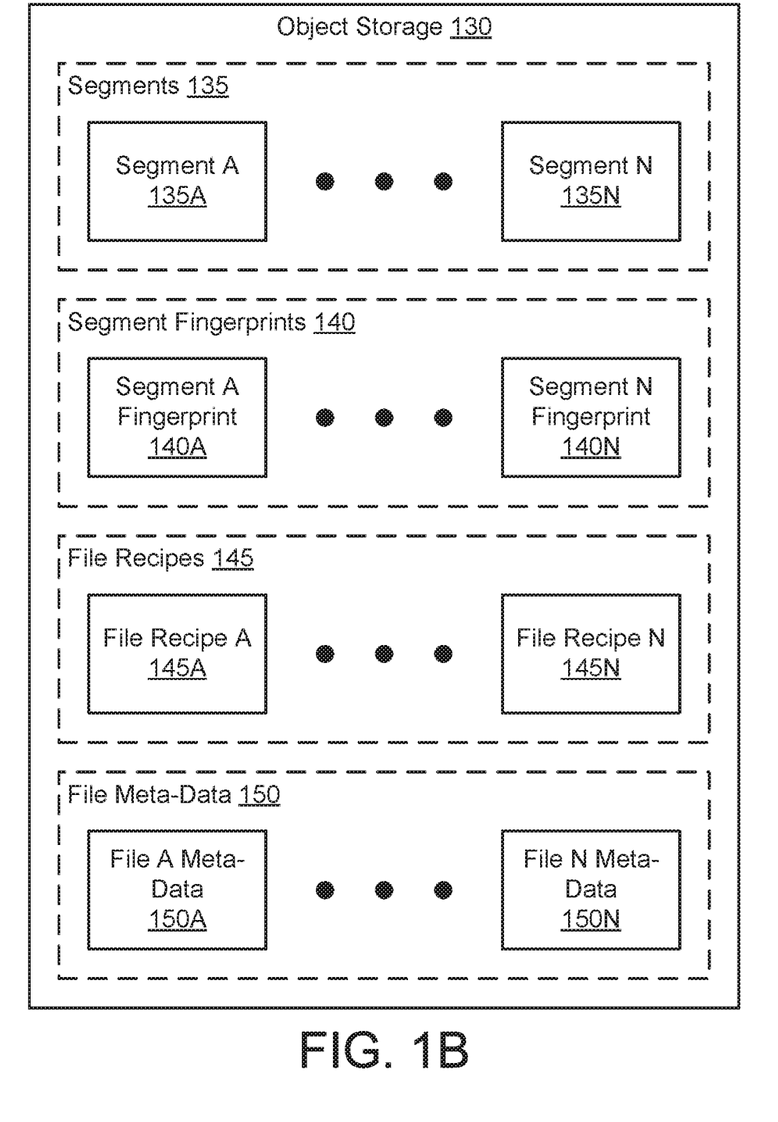
FIG. 1B shows a diagram of an object storage in accordance with one or more embodiments of the invention.

As discussed above, the object storage (130) may store data. The object storage (130) may store additional information. FIG. 1B shows a diagram of an object storage in accordance with one or more embodiments of the invention. The object storage (130) may include segments (135), segment fingerprints (140), file recipes (145), and file meta-data (150).

The segments (135) may be data structures including portions of data. The segments (135) may be used to reconstruct files stored in the object storage (130).

The segment fingerprints (140) may be fingerprints corresponding to each of the segments (135). Each segment fingerprint (140A, 140N) may be generated automatically when a corresponding segment (135A, 135N) is stored in the object storage. Each segment fingerprint (140A, 140N) may uniquely identify a corresponding bit sequence. Thus, each segment having the same segment fingerprint is the same bit sequence.

The file recipes (145) may be data structures that includes information that enables a number of segments, used to reconstruct a file and stored in the object storage, to be retrieved from the object storage. As described above, when a file, e.g., data, is stored in the object storage, it is broken down into segments and deduplicated. Thus, not all of the segments of each file are stored in the object storage. Rather, only segments of the file that are not already present in the object storage are stored in the object storage when the file is stored in the object storage. For additional details regarding the file recipes (145), See FIG. 1C.

The file meta-data (150) may be data structures that specify meta-data associated with each file stored in the object storage. For additional details regarding the file meta-data (150), See FIG. 1D.

Figure 1C:
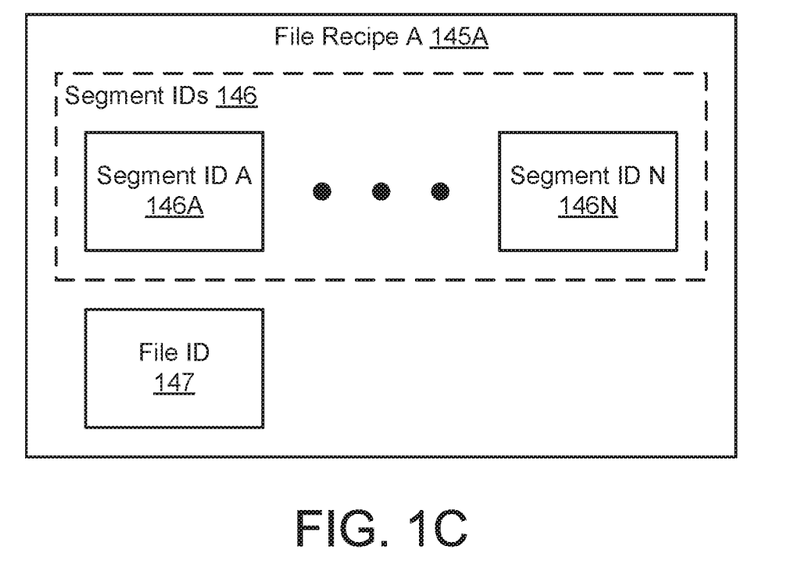
FIG. 1C shows a diagram of a file recipe in accordance with one or more embodiments of the invention.

Returning to the file recipes (145), FIG. 1C shows a diagram of a file recipe A (145A) in accordance with one or more embodiments of the invention. The file recipe A (145A) specifies information used to reconstruct a file stored in the file storage.

In one or more embodiments of the invention, the file recipe A (145A) includes segments identifiers (ID) (146) that specify the identifiers of each segment used to reconstruct the file. The file ID (147) identifies the file.

In one or more embodiments of the invention, the file recipe A (145A) includes only a single segment ID and a file ID. The single segment ID may enable a segment to be retrieved from the object storage. The single segment includes a top level of a tree data structure rather than a portion of a file. The tree may be a segment tree stored in the object storage. Portions of the tree may specify nodes of the tree while other portions of the tree may include segments. The top level of the tree includes information that enables the lower levels of the tree to be obtained from the object storage. Traversing the segment tree using the information included in the tree may enable of the segments used to regenerate the file to be obtained.

While two embodiments of the file recipes used herein have been described above, the file recipes may have other structures without departing from the invention. Embodiments of the file recipe include any data structure that enables segments of a file to be retrieved from the object storage.

In one or more embodiments of the invention, the file recipe A (145A) may include other information that may be used to obtain the segments. For example, information that identifies an object of the object storage that includes a segment may be included. Additionally, the other information may also specify where within an object the segment is located. In other embodiments of the invention, each object may be self-describing, i.e., specifies the contents of the object and the location of the contents within the object. The file recipe may only specify the objects including each respective segment specified by the file recipe.

The file ID (147) may correspond to one or more namespace entries that relate file names or other identification information provided by clients with the name of the file stored in the object storage. When a client requests data stored in the object storage, the data management device may match the file name or other ID provided by the client to a namespace entry. The namespace entry may specify the file ID (147) and, thus, enable the data management device to obtain the file recipe corresponding to the stored file. The data management device may then use the segments specified by the file recipe to obtain the file be reconstructing it using the segments specified by the file recipe.

Figure 1D:
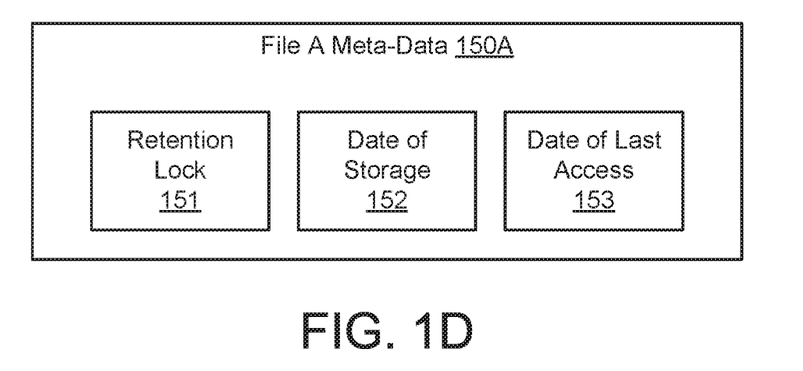
FIG. 1D shows a diagram of an example of meta-data associated with a file stored in an object storage in accordance with one or more embodiments of the invention.

FIG. 1D shows a diagram of file A meta-data (150A) in accordance with one or more embodiments of the invention. The file A meta-data (150A) may specify meta-data of the file stored in the object storage corresponding to the file ID (147, FIG. 1C) of the file recipe A (145A). The file A meta-data (150A) may include a retention lock (151), a date of storage (152) of the file in the object storage, and/or a date of last access (153) of the file in the object storage. The file A meta-data (150A) may include different, more, or less data regarding the associated file without departing from the invention.

Figure 2A:
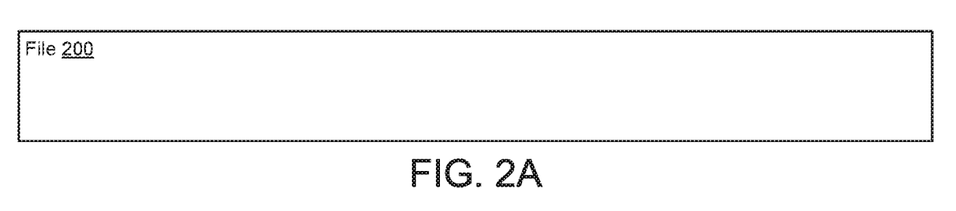
FIG. 2A shows a diagram of a file in accordance with one or more embodiments of the invention.
Figure 2B:
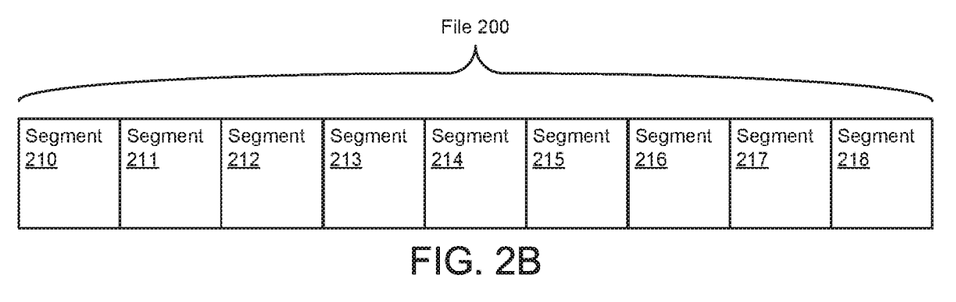
FIG. 2B shows a diagram of a relationship between segments of a file and the file in accordance with one or more embodiments of the invention.

As discussed above, when a file is sent to the data management device for storage, the data management device may divide the file into segments. FIGS. 2A-2B show diagrams that illustrate relationships between a file (200) and segments (210-218) of the file (200).

FIG. 2A shows a diagram of a file (200) in accordance with one or more embodiments of the invention. The data may be any type of data in any format and of any length.

FIG. 2B shows a diagram of segments (210-218) of the file (200) of the data. Each segment may include separate, distinct portions of the file (200). Each of the segments may be of different, but similar lengths. For example, each segment may include approximately 8 kilobytes of data, e.g., a first segment may include 8.03 kilobytes of data, the second segment may include 7.96 kilobytes of data, etc. In one or more embodiments of the invention, the average amount of data of each segment is between 7.95 and 8.05 kilobytes.

FIGS. 3A-3F show flowcharts in accordance with one or more embodiments of the invention. The flowcharts illustrate methods that may be used to deduplicate data. As discussed above, when data is stored in the object storage, it may only be partially deduplicated and thereby reduce the required IO of the storage when compared to complete deduplication of the data. The following methods may be used to completely deduplicate the partially deduplicated already stored in an object storage. However, embodiments of the invention are not limited to deduplicating data that has been partially deduplicated. The following methods may be used to deduplicate data that has not been previous deduplicated.

Figure 3A:
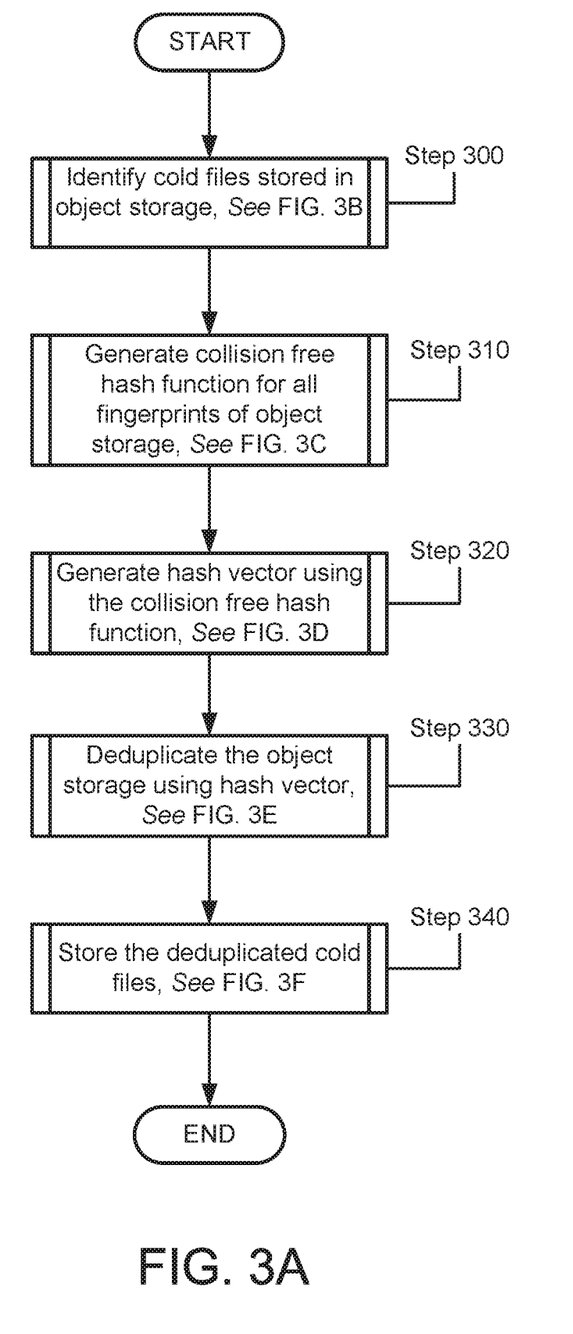
FIG. 3A shows a flowchart of a method of deduplicating data in accordance with one or more embodiments of the invention.

FIG. 3A shows a flowchart of a method in accordance with one or more embodiments of the invention. The method depicted in FIG. 3A may be used to deduplicate data stored in a data storage in accordance with one or more embodiments of the invention. The method shown in FIG. 3A may be performed by, for example, a storage space optimizer (175, FIG. 1A).

In Step 300, cold files stored in the object storage are identified. The cold files may be identified using the method shown in FIG. 3B.

In Step 310, a collision free hash function for all fingerprints of an object storage are generated. The collision free hash function may be generated using the method shown in FIG. 3C.

In Step 320, a hash vector is generated using the collision free hash function. The hash vector may be generated using the method shown in FIG. 3D.

In Step 330, the object storage is deduplicated using the hash vector. The object storage may be deduplicated using the method shown in FIG. 3E.

In Step 340, the deduplicated cold file are stored. The cold files may be stored using the method shown in FIG. 3F.

Figure 3B:
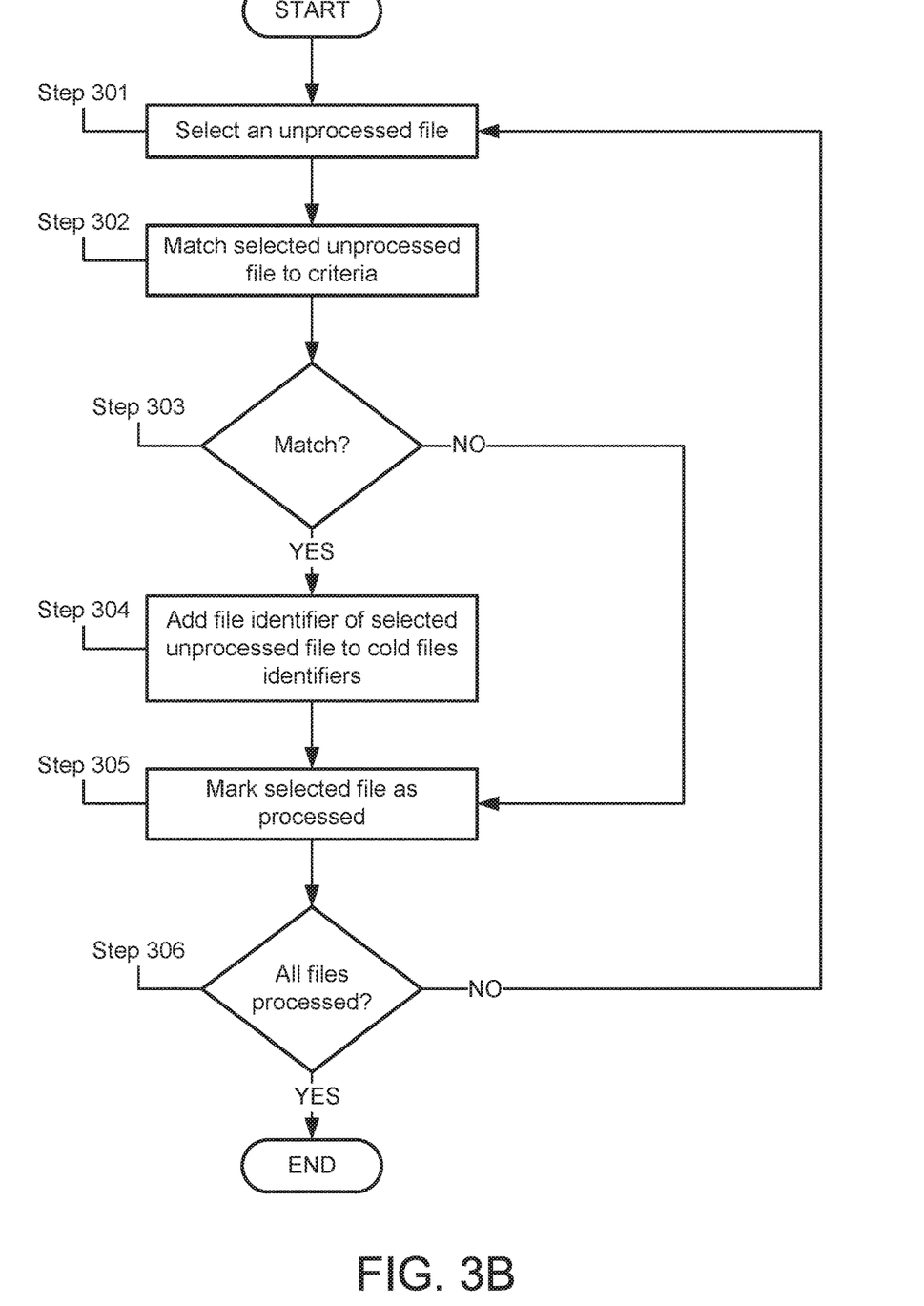
FIG. 3B shows a flowchart of a method of identifying cold files in accordance with one or more embodiments of the invention.

FIG. 3B shows a flowchart of a method in accordance with one or more embodiments of the invention. The method depicted in FIG. 3B may be used to identify cold files stored in an object storage in accordance with one or more embodiments of the invention. The method shown in FIG. 3B may be performed by, for example, a storage space optimizer (175, FIG. 1A).

In Step 301, an unprocessed file stored in the object storage is selected.

In one or more embodiments of the invention, the file is selected randomly. In other words, an unprocessed file is selected. All of the files stored in the object storage may be unprocessed at the start of the method shown in FIG. 3B.

In Step 302, the selected unprocessed file is matched to criteria.

In one or more embodiments of the invention, the criteria may include: (i) whether a retention lock specified by meta-data associated with the file is set so that the file is not deleted, (ii) whether a date of storage specified by meta-data associated with the file is earlier than a predetermined date, and/or (iii) whether a data of last access specified by the meta-data associated with the file is earlier than predetermined date. The criteria may include other criteria without departing from the invention. The criteria may only include one of (i)-(iii) without departing from the invention.

In one or more embodiments of the invention, the predetermined date six months before the current date, i.e., the date at the time the method illustrated in FIG. 3B is performed. In one or more embodiments of the invention, the predetermined date three months before the current date, i.e., the date at the time the method illustrated in FIG. 3B is performed. In one or more embodiments of the invention, the predetermined date one month before the current date, i.e., the date at the time the method illustrated in FIG. 3B is performed.

In Step 303, it is determined whether the selected unprocessed file matches a criteria. If the selected unprocessed file matches a criteria, the method proceeds to Step 304. If the selected unprocessed file does not match a criteria, the method proceeds to Step 305.

In Step 304, the file identifier of the selected unprocessed file is added to the cold files identifier.

In Step 305, the selected unprocessed file is marked as processed.

In Step 306, it is determined whether all of the files stored in the object storage have been processed. If all of the files have been processed, the method may end following Step 306. If all of the files have not been processed, the method may proceed to Step 301.

Figure 3C:
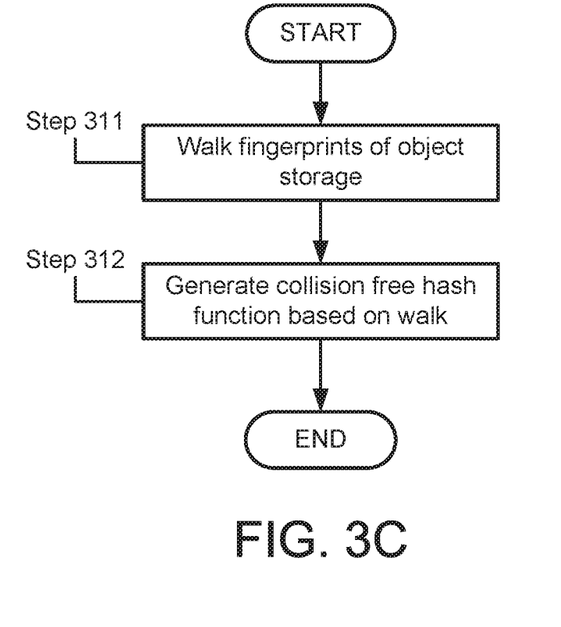
FIG. 3C shows a flowchart of a method of generating a collision free hash function in accordance with one or more embodiments of the invention.

FIG. 3C shows a flowchart of a method in accordance with one or more embodiments of the invention. The method depicted in FIG. 3C may be used to generate a collision free hash function in accordance with one or more embodiments of the invention. The method shown in FIG. 3C may be performed by, for example, a storage space optimizer (175, FIG. 1A).

In Step 311, the fingerprints stored in the object storage are walked.

In Step 312, a collision free hash function is generated based on the walk.

In one or more embodiments of the invention, the collision free hash function may be a perfect hash function. The perfect hash function may map each of the unique fingerprints walked in Step 311 to different bits of a bit vector. Multiple fingerprints walked in Step 311 that have the same bit sequence map to the same bit of the bit vector.

The method may end following Step 312.

Figure 3D:
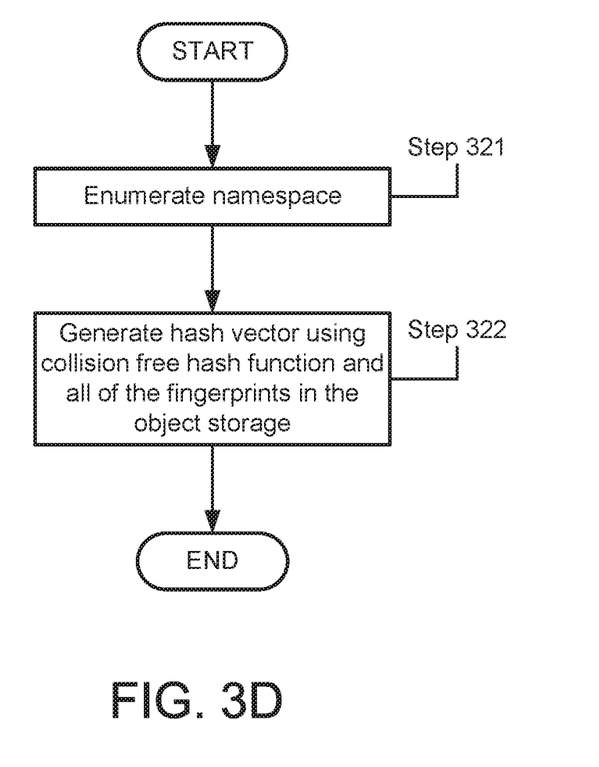
FIG. 3D shows a flowchart of a method of generating a hash vector in accordance with one or more embodiments of the invention.

FIG. 3D shows a flowchart of a method in accordance with one or more embodiments of the invention. The method depicted in FIG. 3D may be used to generate a hash vector in accordance with one or more embodiments of the invention. The method shown in FIG. 3D may be performed by, for example, a storage space optimizer (175, FIG. 1A).

In Step 321, the namespace of the object storage is enumerated.

In Step 322, a hash vector is generated using the collision free hash function and all of the fingerprints in the object storage.

In one or more embodiments of the invention, the hash vector is a perfect hash live vector generated using a perfect hash function.

The method may end following Step 322.

Figure 3E:
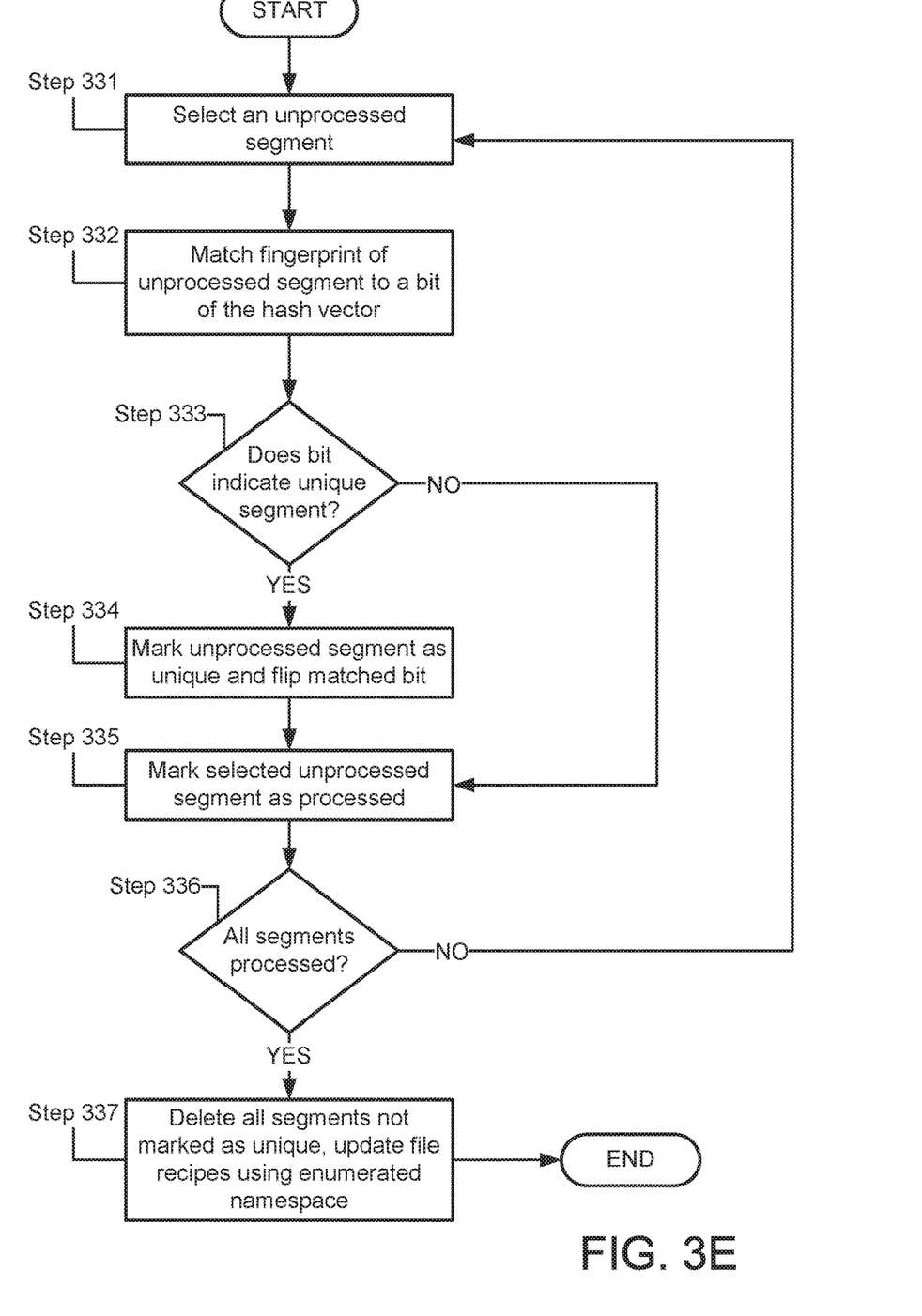
FIG. 3E shows a flowchart of a method of deduplicating an object storage using the hash vector in accordance with one or more embodiments of the invention.

FIG. 3E shows a flowchart of a method in accordance with one or more embodiments of the invention. The method depicted in FIG. 3E may be used to deduplicate an object storage in accordance with one or more embodiments of the invention. The method shown in FIG. 3E may be performed by, for example, a storage space optimizer (175, FIG. 1A).

In Step 331, an unprocessed segment of the object storage is selected.

In Step 332, a fingerprint of the unprocessed segment is matched to a bit of the hash vector. The fingerprint may be matched to the hash vector using the collision free hash function.

In Step 333, it is determined whether the matched bit indicates that the unprocessed segment is unique. If the matched bit indicates that the unprocessed segment is unique, the method proceeds to Step 334. If the matched bit does not indicate that the unprocessed segment is unique, the method proceeds to Step 335.

In one or more embodiments of the invention, the value of the matched bit may indicate whether the unprocessed segment is unique. When the hash vector is generated, each bit may be set to a predetermined value. If a bit is not the predetermined value when a fingerprint is matched to the bit, the segment associated with the matched fingerprint may be considered to not be unique.

In Step 334, the unprocessed segment is marked as unique and the bit of the hash vector to which the fingerprint associated with the unprocessed segment was matched is flipped.

In Step 335, the selected unprocessed segment is marked as processed.

In Step 336, it is determined whether all of the segments of the object storage have been processed. If all of the segments have been processed, the method proceeds to Step 337. If all of the segments have not been processed, the method proceeds to Step 331.

In Step 337, all of the segments not marked as unique are deleted and all of the file recipes are updated using the enumerated namespace.

Each of the file recipes may be updated by modifying any segment ID specified by a file recipe of a segment that was deleted. Each of the segments IDs associated with segments that were deleted may be replaced with segment IDs of corresponding unique segments. In other words, when multiple copies of segments stored in the object storage are consolidated to a single copy stored in the object storage, all of the file recipes are updated to reflect the consolidation, e.g., all of the segments having fingerprints that mapped to the same bit in the hash vector are consolidated into a single segment and all of the file recipes that included segment IDs of any of the aforementioned segments are modified to have the segment ID of the consolidated segment.

The method may end following Step 337.

Figure 3F:
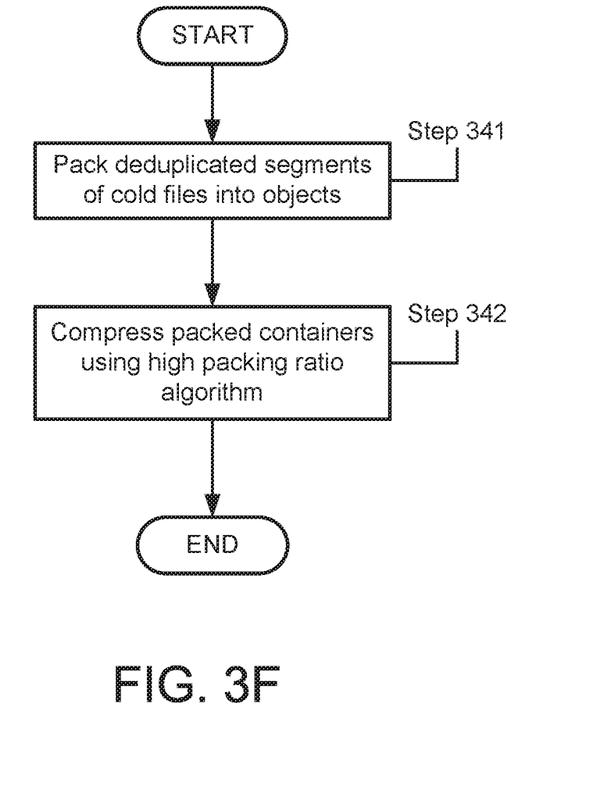
FIG. 3F shows a flowchart of a method of compressing dedulicated cold files in accordance with one or more embodiments of the invention.

FIG. 3F shows a flowchart of a method in accordance with one or more embodiments of the invention. The method depicted in FIG. 3F may be used to super compress the deduplicated cold files in accordance with one or more embodiments of the invention. The method shown in FIG. 3F may be performed by, for example, a storage space optimizer (175, FIG. 1A).

In Step 341, the segments of each of the cold files are packed into objects of the object storage.

In Step 342, the objects are compressed using a high packing ratio compression method. As used herein, a high packing ratio method is a method of compressing binary data that utilizes a large number of computational cycles to compress data into a size that is smaller than a size when compressed when using a fewer number of computational cycles.

In one or more embodiments of the invention, the high packing ratio compression method is a loss less compression method.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following: i) complete deduplication of data stored in an object storage, ii) reduced storage space used to store a deduplicated storage, and iii) improve the storage capacity of a data storage by removing duplicate data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data management device, comprising:
a persistent storage comprising an object storage; and
a processor programmed to perform a method, comprising:
making a first determination that segments stored in the object storage are cold;
generating, based on the first determination, a hash function based on the segments;
generating a hash vector using the hash function, wherein the hash vector is a perfect hash live vector comprising a number of bits corresponding to a number of unique segments stored in the object storage;
deduplicating the segments using the hash vector, wherein deduplicating the segment comprises:
matching each fingerprint of each segment to a plurality of bits of the hash vector;
making a second determination that a plurality of fingerprints match a first bit of the plurality of bits;
identifying, based on the second determination, a first segment associated with a first fingerprint of the plurality of fingerprints;
marking the first segment as unique; and
deleting all of the segments associated with the plurality of fingerprints other than the first segment; and
storing the deduplicated segments in the object storage.

2. The data management device of claim 1, wherein the hash function is a perfect hash function.

3. The data management device of claim 2, wherein the hash function maps each unique segment in the object storage to a different bit in the hash vector.

4. The data management device of claim 1, wherein deduplicating the segments using the hash vector further comprises:
identifying a file recipe that specifies a segment of the deleted segments associated with the plurality of fingerprints other than the first segment; and
updating the identified file recipe based on the first segment associated with the first fingerprint of the plurality of fingerprints.

5. The data management device of claim 1, wherein storing the deduplicated segments in the object storage comprises:
packing the deduplicated segments into an object of the object storage; and
super compressing the packed segments.

6. The data management device of claim 1, wherein the method further comprises:
obtaining a data access request that requests a first file stored in the object storage;
obtaining a first file recipe associated with the first file;

generating the first file, based on the first file recipe, using the first segment stored in the object storage and a second segment stored in the object storage, wherein the first segment is also associated with a second file; and providing the first file in response to the data access request.

7. A method of operating a data management device, comprising:

make a first determination, by the data management device, that segments stored in an object storage are cold;

generating, based on the first determination, a hash function based on the segments;

generating a hash vector using the hash function, wherein the hash vector is a perfect hash live vector comprising a number of bits corresponding to a number of unique segments stored in the object storage;

deduplicating the segments using the hash vector, wherein deduplicating the segment comprises:

matching each fingerprint of each segment to a plurality of bits of the hash vector:

making a second determination that a plurality of fingerprints match a first bit of the plurality of bits;

identifying, based on the second determination, a first segment associated with a first fingerprint of the plurality of fingerprints;

marking the first segment as unique; and deleting all of the segments associated with the plurality of fingerprints other than the first segment; and storing the deduplicated segments in the object storage.

8. The method of claim 7, wherein deduplicating the segments using the hash vector further comprises:

identifying a file recipe that specifies a segment of the deleted segments associated with the plurality of fingerprints other than the first segment; and updating the identified file recipe based on the first segment associated with the first fingerprint of the plurality of fingerprints.

9. The method of claim 7, wherein the method further comprises:

obtaining a data access request that requests a first file stored in the object storage;

obtaining a first file recipe associated with the first file;

generating the first file, based on the first file recipe, using the first segment stored in the object storage and a second segment stored in the object storage, wherein the first segment is also associated with a second file; and providing the first file in response to the data access request.

10. A non-transitory computer readable medium comprising computer readable program code, which when executed by a computer processor enables the computer processor to perform a method for operating a data management device, the method comprising:

making a first determination, by the data management device, that segments stored in an object storage are cold;

generating, based on the first determination, a hash function based on the segments;

generating a hash vector using the hash function, wherein the hash vector is a perfect hash live vector comprising a number of bits corresponding to a number of unique segments stored in the object storage;

deduplicating the segments using the hash vector, wherein deduplicating the segment comprises:

matching each fingerprint of each segment to a plurality of bits of the hash vector;

making a second determination that a plurality of fingerprints match a first bit of the plurality of bits;

identifying, based on the second determination, a first segment associated with a first fingerprint of the plurality of fingerprints;

marking the first segment as unique; and deleting all of the segments associated with the plurality of fingerprints other than the first segment; and storing the deduplicated segments in the object storage.

11. The non-transitory computer readable medium of claim 10, wherein the method further comprises:

obtaining a data access request that requests a first file stored in the object storage;

obtaining a first file recipe associated with the first file;

generating the first file, based on the first file recipe, using the first segment stored in the object storage and a second segment stored in the object storage, wherein the first segment is also associated with a second file; and providing the first file in response to the data access request.

* * * * *